(12) United States Patent
Lee et al.

(10) Patent No.: US 8,803,903 B2
(45) Date of Patent: Aug. 12, 2014

(54) COLOR SPACE DETERMINATION DEVICES AND DISPLAY DEVICES AND SYSTEMS INCLUDING THE SAME

(75) Inventors: Sang-Hyun Lee, Hwaseong-si (KR); Hong-Mi Choi, Yongin-si (KR); Taek-Kyun Shin, Gwangmyeong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 322 days.

(21) Appl. No.: 13/419,085

(22) Filed: Mar. 13, 2012

(65) Prior Publication Data
US 2012/0236205 A1 Sep. 20, 2012

(30) Foreign Application Priority Data
Mar. 16, 2011 (KR) .................. 10-2011-0023135

(51) Int. Cl.
*G09G 5/00* (2006.01)
*G09G 5/02* (2006.01)
*H04N 11/02* (2006.01)
*H04N 11/06* (2006.01)
*H04N 9/64* (2006.01)
*H04N 1/40* (2006.01)
*G03F 3/08* (2006.01)
*G06K 9/00* (2006.01)
*G06K 9/40* (2006.01)
*G06K 9/36* (2006.01)

(52) U.S. Cl.
USPC ........... 345/589; 345/591; 345/601; 345/606; 345/690; 348/430.1; 348/488; 348/571; 358/445; 358/448; 358/518; 382/162; 382/254; 382/276

(58) Field of Classification Search
USPC ......... 345/581, 589–591, 600–601, 606, 618, 345/547–549, 204, 690, 698; 348/222.1, 348/254, 425.2, 430.1, 431.1, 467, 488, 348/560, 571, 575, 582, 670, 715; 382/162, 382/166, 167, 254, 274, 276; 358/518–519, 358/523, 525, 530, 445, 448
See application file for complete search history.

(56) References Cited

U.S. PATENT DOCUMENTS 4,682,225 A * 7/1987 Graham ................... 375/240.21
8,427,547 B1 * 4/2013 Linzer et al. ............... 348/220.1
(Continued)

FOREIGN PATENT DOCUMENTS

| JP | 2007-125728 A | 5/2007 |
| KR | 2007-0058204 A | 6/2007 |
| KR | 10-0744018 B1 | 7/2007 |

*Primary Examiner* — Wesner Sajous
(74) *Attorney, Agent, or Firm* — Harness, Dickey & Pierce, P.L.C.

(57) ABSTRACT

A color space determination device may include a sampling configuration unit and determination unit. The sampling configuration unit may be configured to determine a sampling ratio and a sampling number based on a resolution of input video data, the sampling ratio being a ratio of a number of the input video data to be sampled to a total number of the input video data included in a frame, the sampling number being a number of frames to be sampled. The determination unit may be configured to receive the input video data in units of frames, to sample the input video data with the sampling ratio for each of the sampling number of frames, and to generate a color space signal representing a color space of the input video data based on the sampled input video data that are sampled from the sampling number of frames of the input video data.

20 Claims, 8 Drawing Sheets

(56) References Cited

U.S. PATENT DOCUMENTS

| | | | |
|---|---|---|---|
| 8,520,009 B1 * | 8/2013 | Lew et al. | 345/501 |
| 2010/0208989 A1 * | 8/2010 | Narroschke et al. | 382/166 |
| 2011/0280307 A1 * | 11/2011 | MacInnis et al. | 375/240.15 |
| 2012/0321220 A1 * | 12/2012 | Kameyama et al. | 382/300 |

* cited by examiner

| RESOLUTION | SAMPLING RATIO | SAMPLING NUMBER |
|---|---|---|
| 3840X2160 (4 FULL HD) | 1% | 100 |
| 1920X1080 (FULL HD) | 1% | 100 |
| 1280X720 (HD) | 1% | 100 |
| 800X480 (WVGA) | 3% | 33 |
| 720X480 (D1) | 3% | 33 |
| 640X480 (VGA) | 3% | 33 |
| 480X320 (HVGA) | 5% | 20 |
| 352X288 (CIF) | 5% | 20 |
| 320X240 (QVGA) | 5% | 20 |
| 176X144 (QCIF) | 5% | 20 |

COLOR SPACE DETERMINATION DEVICES AND DISPLAY DEVICES AND SYSTEMS INCLUDING THE SAME

CROSS-REFERENCE TO RELATED APPLICATION(S)

This application claims priority from Korean Patent Application No. 10-2011-0023135, filed on Mar. 16, 2011, in the Korean Intellectual Property Office (KIPO), the entire contents of which are incorporated herein by reference.

BACKGROUND

1. Technical Field

Example embodiments may relate to image processing. More particularly, example embodiments may relate to color space determination devices and display devices including the color space determination devices.

2. Description of the Related Art

Generally, video data may be classified as video data having a wide color space and video data having a narrow color space according to a range of a value that each of video data might have.

An image processor may receive input video data stored in a storage device or received from a communication device, and may generate output video data by converting a format of the input video data into a red, green, blue (RGB) format. To increase a performance of a color reproduction, the image processor may be required to generate the output video data having a wide color space when the input video data has a wide color space, and may be required to generate the output video data having a narrow color space when the input video data has a narrow color space.

SUMMARY

Example embodiments may be directed color space determination devices able to determine a color space of input video data.

Example embodiments also may be directed to display devices including the color space determination devices.

According to example embodiments, a color space determination device may include a sampling configuration unit and/or a determination unit. The sampling configuration unit may determine a sampling ratio and/or a sampling number based on a resolution of input video data. The sampling ratio may be a ratio of a number of the input video data to be sampled to a total number of the input video data included in a frame. The sampling number may be a number of frames to be sampled. The determination unit may receive the input video data in units of frames (e.g., frame by frame), may sample the input video data with the sampling ratio for each of the sampling number of frames, and/or may generate a color space signal representing a color space of the input video data based on the sampled input video data that are sampled from the sampling number of frames of the input video data.

According to example embodiments, the sampling configuration unit may decrease the sampling ratio and/or increase the sampling number as the resolution of the input video data increases.

According to example embodiments, the sampling configuration unit may include a table having entries, each of which may store a sampling ratio, a sampling number, and/or a resolution. One or more of the sampling ratio, sampling number, and resolution may be predetermined.

The sampling configuration unit may read the sampling ratio and/or the sampling number from an entry of the table that stores the resolution corresponding to the resolution of the input video data, and output the sampling ratio and the sampling number as the sampling ratio and the sampling number, respectively.

According to example embodiments, the determination unit may sample the input video data at different locations in a frame for each of the sampling number of frames.

According to example embodiments, the determination unit may generate the color space signal based on a number of the sampled input video data having a value used in a wide color space and not used in a narrow color space.

According to example embodiments, the determination unit may include a sampling unit, an examination unit, and/or a comparison unit. The sampling unit may be configured to receive the input video data in units of frames (e.g., frame by frame), to sample the input video data with the sampling ratio for each of the sampling number of frames, and/or to output the sampled input video data for each of the sampling number of frames. The examination unit may be configured to generate a wide number by accumulatively counting a number of the sampled input video data having a value used in a wide color space and not used in a narrow color space among the sampled input video data sampled from the sampling number of frames of the input video data. The comparison unit may be configured to generate the color space signal by comparing the wide number with a threshold number.

The sampling unit may sample the input video data included in a sampling region of a frame, which has an area corresponding to the sampling ratio, for each of the sampling number of frames, where the sampling regions of the sampling number of frames is different from each other.

The examination unit may generate the wide number by accumulatively counting a number of the sampled input video data having a value from 0 to 15 or from 236 to 255 among the sampled input video data sampled from the sampling number of frames of the input video data.

The examination unit may receive the sampling number from the sampling configuration unit, and/or may reset the wide number after receiving the sampled input video data from the sampling unit the sampling number of times.

The comparison unit may determine the color space of the input video data as a narrow color space and/or may generate the color space signal having a first logic level when the wide number is less than the threshold number, and/or may determine the color space of the input video data as a wide color space and/or may generate the color space signal having a second logic level when the wide number is equal to or greater than the threshold number.

The determination unit may further include a multiplexer configured to output one of the color space signal received from the comparison unit and a default color space signal representing one of a wide color space and a narrow color space in response to an enable signal.

The multiplexer may output the color space signal received from the comparison unit when the enable signal has a logic high level, and/or may output the default color space signal when the enable signal has a logic low level.

According to example embodiments, a display device may include a color space determination device, an image processor, and/or a display unit. The color space determination device may generate a color space signal representing a color space of input video data based on a resolution of the input video data. The image processor may receive the input video data, and/or may generate output video data by converting a format of the input video data based on the color space signal.

The display unit may display the output video data reflected, for example, in an output video signal. The color space determination device may include a sampling configuration unit and/or a determination unit. The sampling configuration unit may determine a sampling ratio and/or a sampling number based on the resolution of the input video data, where the sampling ratio may be a ratio of a number of the input video data to be sampled to a total number of the input video data included in a frame, and/or the sampling number may be a number of frames to be sampled. The determination unit may receive the input video data by a unit of a frame, may sample the input video data with the sampling ratio for each of the sampling number of frames, and/or may generate the color space signal based on the sampled input video data that are sampled from the sampling number of frames of the input video data.

According to example embodiments, the image processor may store a first conversion coefficient corresponding to a wide color space and/or a second conversion coefficient corresponding to a narrow color space, and/or may generate the output video data by converting a format of the input video data into a RGB format using one of the first conversion coefficient and the second conversion coefficient selected in response to the color space signal.

According to example embodiments, a determination unit may include a sampling unit configured to receive input video data in units of frames, to sample the input video data with a sampling ratio for each of a sampling number of frames, and/or to output the sampled input video data for each of the sampling number of frames; an examination unit configured to generate a wide number by accumulatively counting a number of the sampled input video data having a value used in a wide color space and not used in a narrow color space among the sampled input video data sampled from the sampling number of frames of the input video data; and/or a comparison unit configured to generate a color space signal by comparing the wide number with a threshold number.

According to example embodiments, the determination unit may further include a multiplexer configured to output one of the color space signal received from the comparison unit and a default color space signal representing one of the wide color space and the narrow color space in response to an enable signal.

According to example embodiments, a system may include a storage device and/or a display device. The storage device may be configured to store video data. The display device may include a color space determination device, an image processor, and/or a display unit. The color space determination device may be configured to sample the video data. The color space determination device may be configured to generate a color space signal representing a color space of the video data based on the sampled video data. The image processor may be configured to generate output video data based on the sampled video data and the color space signal. The display unit may be configured to display the output video data.

According to example embodiments, the color space signal may correspond to a wide color space.

According to example embodiments, the image processor may generate the output video data by converting a format of the video data into a red, green, blue (RGB) format.

According to example embodiments, the image processor may store a first conversion coefficient corresponding to a wide color space and a second conversion coefficient corresponding to a narrow color space and/or may generate the output video data by converting a format of the video data into a red, green, blue (RGB) format using one of the first conversion coefficient and the second conversion coefficient selected in response to the color space signal.

According to example embodiments, the video data is sampled at different locations for each frame of the video data that is sampled.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 2 is a diagram illustrating an example of a table included in a sampling configuration unit of FIG. 1;

DETAILED DESCRIPTION

Figure 1:
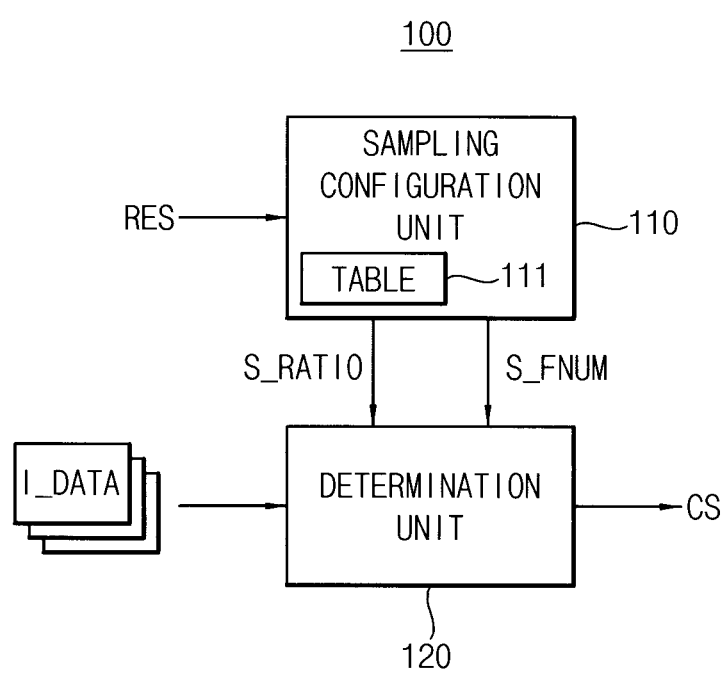
FIG. 1 is a block diagram illustrating a color space determination device according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram illustrating a color space determination device according to example embodiments.

Referring to FIG. 1, a color space determination device 100 may include a sampling configuration unit 110 and/or a determination unit 120.

The sampling configuration unit 110 may receive a resolution RES of input video data I_DATA from outside. The sampling configuration unit 110 may determine a sampling ratio S_RATIO and/or a sampling number S_FNUM based on the resolution RES of the input video data I_DATA. The sampling ratio S_RATIO may be a ratio of a number of the input video data I_DATA to be sampled to a total number of the input video data I_DATA included in a frame. The sampling number S_FNUM may be a number of frames of the input video data I_DATA to be sampled.

The determination unit 120 may receive the input video data I_DATA by a unit of a frame from outside, and/or may receive the sampling ratio S_RATIO and/or the sampling number S_FNUM from the sampling configuration unit 110. The determination unit 120 may sample the input video data I_DATA with the sampling ratio S_RATIO for each of the sampling number S_FNUM of frames to generate sampled input video data for each of the sampling number S_FNUM of frames. The determination unit 120 may determine a color space of the input video data I_DATA and/or may generate a color space signal CS representing the color space of the input video data I_DATA based on the sampled input video data that are sampled from the sampling number S_FNUM of frames of the input video data I_DATA.

For example, the determination unit 120 may determine the color space of the input video data I_DATA as one of a wide color space and a narrow color space. Therefore, the color space signal CS may represent one of a wide color space and a narrow color space. A range of a value that each of the input video data I_DATA may have is relatively wide when the input video data I_DATA has a wide color space, and a range of a value that each of the input video data I_DATA may have is relatively narrow when the input video data I_DATA has a narrow color space.

Generally, an image processor may receive input video data stored in a storage device or received from a communication device, and/or may generate output video data by converting a format of the input video data into a RGB format, so that a display unit displays the output video data. To increase a performance of a color reproduction, the image processor may be required to generate the output video data having a wide color space when the input video data has a wide color space, and/or maybe required to generate the output video data having a narrow color space when the input video data has a narrow color space. To achieve this, a conventional display device may require a user to select one of a wide color space and a narrow color space which will be used by an image processor in converting the input video data into the output video data. However, a user may not be able to select a correct color space corresponding to a color space of the input video data since a user usually does not know a color space of the input video data.

On the contrary, the color space determination device 100 according to example embodiments may determine a color space of the input video data I_DATA based on the resolution RES of the input video data I_DATA and/or may generate the color space signal CS representing the color space of the input video data I_DATA during operation. As will be described later with reference to FIG. 8, the color space determination device 100 may provide the color space signal CS to an image processor, so that the image processor may generate output video data having a same color space as a color space of the input video data I_DATA by converting a format of the input video data I_DATA into a RGB format based on the color space signal CS received from the color space determination device 100.

If the color space determination device 100 determines the color space of the input video data I_DATA by sampling all the input video data I_DATA included in a frame, a time for the color space determination device 100 to analyze one frame may increase such that the color space determination device 100 may slow down an overall operation speed of a display device including the color space determination device 100. Therefore, the color space determination device 100 may sample only a part of the input video data I_DATA among all the input video data I_DATA included in a frame according to the sampling ratio S_RATIO to determine the color space of the input video data I_DATA. That is, as described above, the sampling configuration unit 110 may determine the sampling ratio S_RATIO, which represents a ratio of a number of the input video data I_DATA to be sampled to a total number of the input video data I_DATA included in a frame, and/or the sampling number S_FNUM, which represents a number of frames of the input video data I_DATA to be sampled, based on the resolution RES of the input video data I_DATA. The determination unit 120 may sample the input video data I_DATA with the sampling ratio S_RATIO for each of the sampling number S_FNUM of frames, may determine the color space of the input video data I_DATA, and may generate the color space signal CS based on the sampled input video data that are sampled from the sampling number S_FNUM of frames of the input video data I_DATA. As such, the color space determination device 100 may decrease a time required to analyze one frame such that the color space determination device 100 may not influence an overall operation speed of a display device including the color space determination device 100.

If the color space determination device 100 samples the input video data I_DATA with a fixed sampling ratio regardless of the resolution RES of the input video data I_DATA, a time for the color space determination device 100 to analyze one frame may increase as the resolution RES of the input video data I_DATA increases such that the color space determination device 100 may slow down an overall operation speed of a display device including the color space determination device 100. Therefore, the color space determination device 100 may decrease the sampling ratio S_RATIO and increase the sampling number S_FNUM as the resolution RES of the input video data I_DATA increases. Alternatively, the color space determination device 100 may increase the sampling ratio S_RATIO and decrease the sampling number S_FNUM as the resolution RES of the input video data I_DATA decreases. As such, the color space determination device 100 may control a time required to analyze one frame.

In example embodiments, the sampling configuration unit 110 may include a table 111 that has entries each of which stores a sampling ratio, a sampling number, and a resolution. One or more of the sampling ratio, sampling number, and resolution may be predetermined.

FIG. 2 is a diagram illustrating an example of a table included in a sampling configuration unit of FIG. 1.

Referring to FIG. 2, the table 111 may include a resolution field, a sampling ratio field, and/or a sampling number field.

The resolution field may store a resolution (that may or may not be predetermined). As illustrated in FIG. 2, the resolution field may store a standard resolution of video data. The sampling ratio field may store a sampling ratio (that may or may not be predetermined) that may be selected as the sampling ratio S_RATIO when a resolution (that may or may not be predetermined) stored in the same entry is equal to the resolution RES of the input vide data I_DATA. The sampling number field may store a sampling number (that may or may not be predetermined) that may be selected as the sampling number S_FNUM when a resolution (that may or may not be predetermined) stored in the same entry is equal to the resolution RES of the input vide data I_DATA.

The sampling configuration unit 110 may read the sampling ratio (that may or may not be predetermined) and/or the sampling number (that may or may not be predetermined) from an entry of the table 111 that stores the resolution (that may or may not be predetermined) corresponding to the resolution RES of the input video data I_DATA, and may output the sampling ratio (that may or may not be predetermined) and/or the sampling number (that may or may not be predetermined) as the sampling ratio S_RATIO and the sampling number S_FNUM, respectively.

For example, as illustrated in FIG. 2, the sampling configuration unit 110 may determine the sampling ratio S_RATIO as 5% and/or may determine the sampling number S_FNUM as 20 when the resolution RES of the input video data I_DATA is less than VGA (Video Graphic Adapter). The sampling configuration unit 110 may determine the sampling ratio S_RATIO as 3% and/or may determine the sampling number S_FNUM as 33 when the resolution RES of the input video data I_DATA is equal to or greater than VGA (Video Graphic Adapter) and less than HD (High Definition). The sampling configuration unit 110 may determine the sampling ratio S_RATIO as 1% and/or may determine the sampling number S_FNUM as 100 when the resolution RES of the input video data I_DATA is equal to or greater than HD (High Definition).

The sampling ratio (that may or may not be predetermined) and the sampling number (that may or may not be predetermined) according to the resolution (that may or may not be predetermined) of FIG. 2 serves as an example embodiment. In example embodiments, the table 111 may store other values for the sampling ratio (that may or may not be predetermined) and/or the sampling number (that may or may not be predetermined) according to the resolution (that may or may not be predetermined).

Images of consecutive frames may be similar to each other in general video data. Therefore, if the determination unit 120 samples the input video data I_DATA of same locations in a frame for each of the sampling number S_FNUM of frames, a possibility of determining the color space of the input video data I_DATA incorrectly may increase. Therefore, the determination unit 120 may sample the input video data I_DATA at different locations in a frame for each of the sampling number S_FNUM of frames.

The determination unit 120 may determine the color space of the input video data I_DATA and/or may generate the color space signal CS representing the color space of the input video data I_DATA based on a number of the sampled input video data having a value used in a wide color space and not used in a narrow color space.

Figure 3:
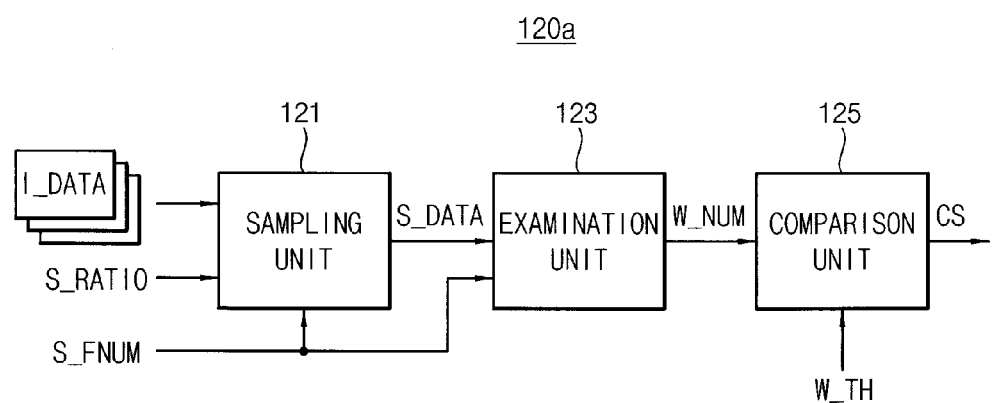
FIG. 3 is a block diagram illustrating an example of a determination unit included in a color space determination device of FIG. 1.

FIG. 3 is a block diagram illustrating an example embodiment of a determination unit included in a color space determination device of FIG. 1.

Referring to FIG. 3, a determination unit 120a may include a sampling unit 121, an examination unit 123, and/or a comparison unit 125.

The sampling unit 121 may receive the input video data I_DATA by a unit of a frame from outside, and/or may receive the sampling ratio S_RATIO from the sampling configuration unit 110. The sampling unit 121 may sample the input video data I_DATA with the sampling ratio S_RATIO for each of the sampling number S_FNUM of frames, and/or may output the sampled input video data S_DATA for each of the sampling number S_FNUM of frames. To decrease a possibility of determining the color space of the input video data I_DATA incorrectly, the sampling unit 121 may sample the input video data I_DATA at different locations in a frame for each of the sampling number S_FNUM of frames.

Figure 4:
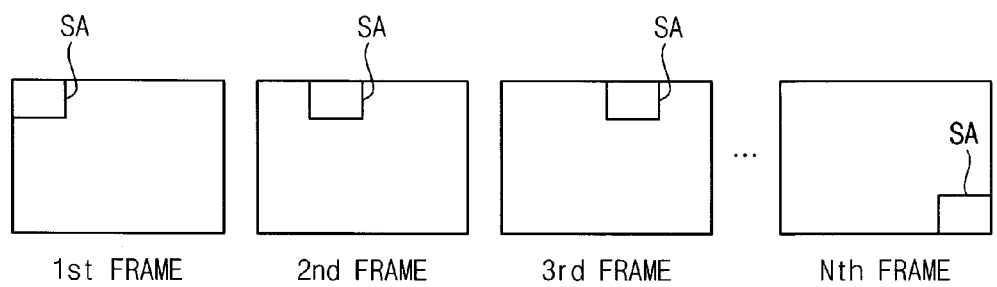
FIG. 4 is a diagram for describing an operation of a sampling unit included in a determination unit of FIG. 3.

FIG. 4 is a diagram for describing an operation of a sampling unit included in a determination unit of FIG. 3.

In FIG. 4, the sampling number S_FNUM is N, where N is a positive integer. Consecutive N frames are illustrated in FIG. 4.

Referring to FIG. 4, the sampling unit 121 may sample the input video data I_DATA included in a sampling region SA of a frame for each of the sampling number S_FNUM of frames. The sampling region SA may have an area corresponding to the sampling ratio S_RATIO. The sampling regions SA of the sampling number S_FNUM of frames may be different from each other. For example, as illustrated in FIG. 4, the sampling unit 121 may sample the input video data I_DATA included in the sampling region SA of a frame for each of the sampling number S_FNUM of frames while the sampling unit 121 moves the sampling region SA to an adjacent region frame by frame. In example embodiments, the sampling region SA of a current frame may overlap with the sampling region SA of a previous frame. In example embodiments, the sampling region SA of a frame may be randomly determined for each frame.

Referring again to FIG. 3, the examination unit 123 may generate a wide number W_NUM by accumulatively counting a number of the sampled input video data S_DATA having a value used in a wide color space and not used in a narrow color space among the sampled input video data S_DATA sampled from the sampling number S_FNUM of frames of the input video data I_DATA.

The comparison unit 125 may generate the color space signal CS by comparing the wide number W_NUM with a threshold number W_TH.

When the input video data I_DATA has a wide color space, each of the input video data I_DATA may have a value from 0 to 255. Alternatively, when the input video data I_DATA has a narrow color space, each of the input video data I_DATA may have a value from 16 to 235. Therefore, if the input video data I_DATA having a value from 0 to 15 or from 236 to 255 exist, the color space of the input video data I_DATA may be determined as a wide color space. Alternatively, if the input video data I_DATA having a value from 0 to 15 or from 236 to 255 do not exist, the color space of the input video data I_DATA may be determined as a narrow color space. However, even if the input video data I_DATA has a narrow color space, the input video data I_DATA having a value from 0 to 15 or from 236 to 255 may exist because of noise, operational error, etc.

Therefore, the examination unit 123 may generate the wide number W_NUM by accumulatively counting a number of the sampled input video data S_DATA having a value from 0 to 15 or from 236 to 255 among the sampled input video data S_DATA sampled from the sampling number S_FNUM of frames of the input video data I_DATA. The comparison unit 125 may generate the color space signal CS by comparing the wide number W_NUM with the threshold number W_TH. For example, the comparison unit 125 may determine the color space of the input video data I_DATA as a narrow color space and/or may generate the color space signal CS having a first logic level when the wide number W_NUM is less than the threshold number W_TH. Alternatively, the comparison unit 125 may determine the color space of the input video data I_DATA as a wide color space and/or may generate the color space signal CS having a second logic level when the wide number W_NUM is equal to or greater than the threshold number W_TH. As such, the color space determination device 100 may reduce a possibility of determining the color space of the input video data I_DATA incorrectly.

The examination unit 123 may receive the sampling number S_FNUM from the sampling configuration unit 110. The examination unit 123 may reset the wide number W_NUM after receiving the sampled input video data S_DATA from the sampling unit 121 the sampling number S_FNUM of times, so that the examination unit 123 may accumulatively count the number of the sampled input video data S_DATA having a value used in a wide color space and not used in a narrow color space only for the sampling number S_FNUM of frames.

Figure 5:
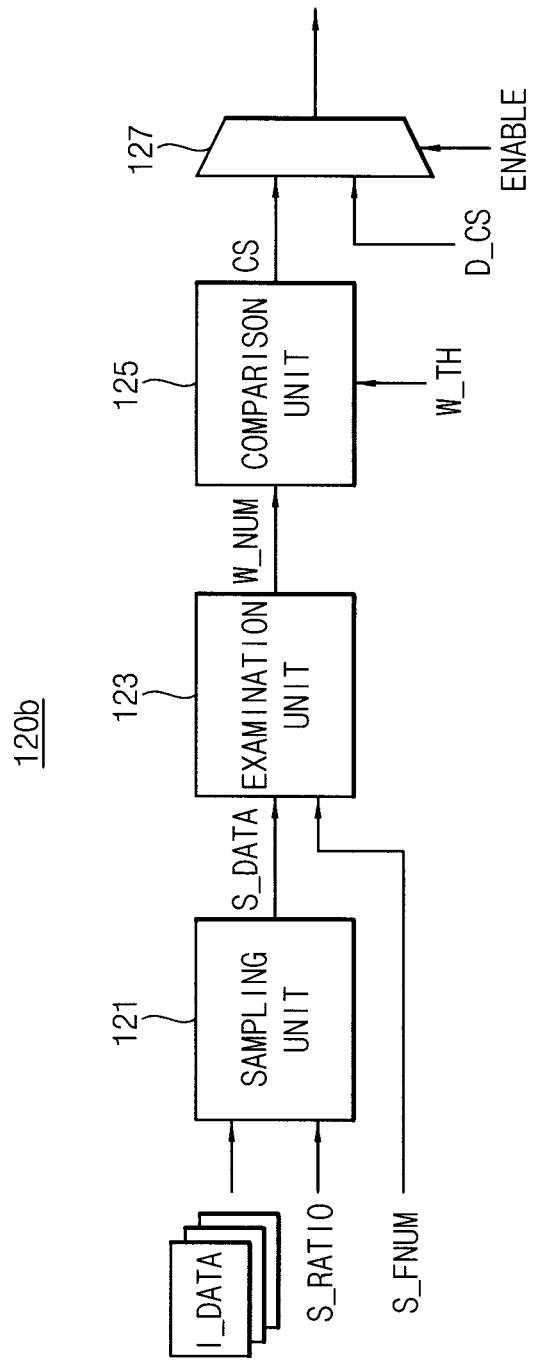
FIG. 5 is a block diagram illustrating another example of a determination unit included in a color space determination device of FIG. 1.

FIG. 5 is a block diagram illustrating another example embodiment of a determination unit included in a color space determination device of FIG. 1.

Referring to FIG. 5, a determination unit 120b may include a sampling unit 121, an examination unit 123, a comparison unit 125, and/or a multiplexer 127.

The determination unit 120b of FIG. 5 may be substantially the same as the determination unit 120a of FIG. 3 except for the multiplexer 127. Therefore, a detail description of the sampling unit 121, the examination unit 123, and/or the comparison unit 125 of FIG. 5 will be omitted.

The multiplexer 127 may receive the color space signal CS from the comparison unit 125, and/or may receive an enable signal ENABLE and/or a default color space signal D_CS from outside. The default color space signal D_CS may represent one of a wide color space and a narrow color space. The multiplexer 127 may output one of the color space signal CS and the default color space signal D_CS in response to the enable signal ENABLE. For example, the multiplexer 127 may output the color space signal CS received from the comparison unit 125 when the enable signal ENABLE has a logic high level, and/or may output the default color space signal D_CS received from outside when the enable signal ENABLE has a logic low level.

Therefore, the determination unit 120b may output the color space signal CS representing the color space of the input video data I_DATA determined by an operation described above when the determination unit 120b receives the enable signal ENABLE having a logic high level from outside, and/or may output the default color space signal D_CS (that may or may not be predetermined) as representing one of a wide color space and a narrow color space regardless of the input video data I_DATA when the determination unit 120b receives the enable signal ENABLE having a logic low level from outside.

Figure 6:
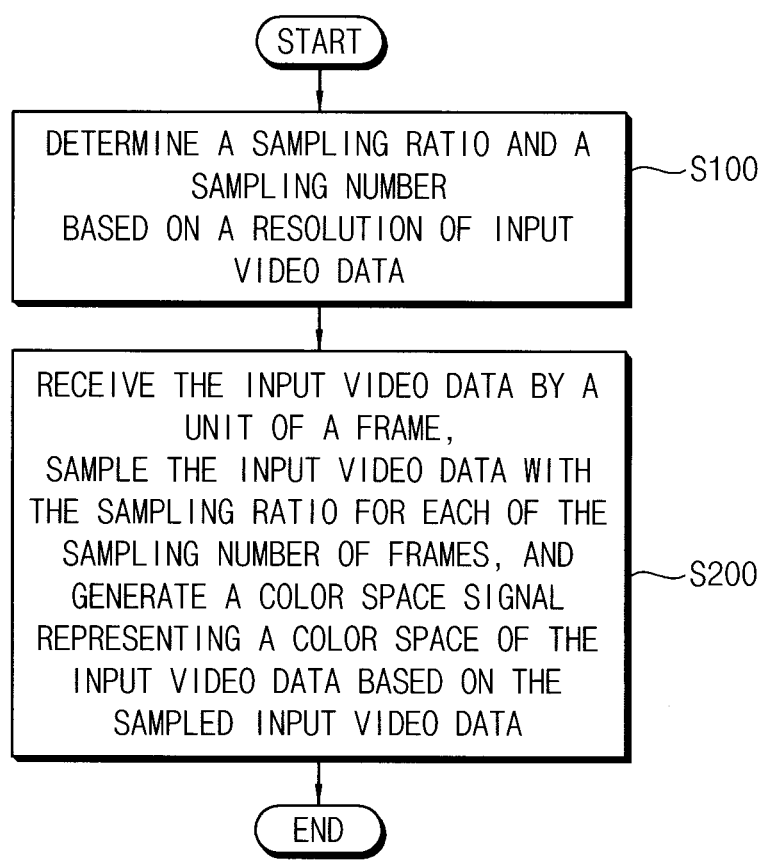
FIG. 6 is a flow chart illustrating a method of determining a color space according to example embodiments.

FIG. 6 is a flow chart illustrating a method of determining a color space according to example embodiments.

The method of determining a color space may be performed by the color space determination device 100 of FIG. 1.

Hereinafter, the method of determining a color space according to example embodiments will be described with reference to FIGS. 1 to 6.

Referring to FIG. 6, a sampling ratio S_RATIO and/or a sampling number S_FNUM may be determined based on a resolution RES of input video data I_DATA (step S100). The sampling ratio S_RATIO may be a ratio of a number of the input video data I_DATA to be sampled to a total number of the input video data I_DATA included in a frame. The sampling number S_FNUM may be a number of frames of the input video data I_DATA to be sampled.

The input video data I_DATA may be received by a unit of a frame, the input video data I_DATA may be sampled with the sampling ratio S_RATIO for each of the sampling number S_FNUM of frames, and/or a color space signal CS representing the color space of the input video data I_DATA may be generated based on the sampled input video data that are sampled from the sampling number S_FNUM of frames of the input video data I_DATA (step S200). The color space of the input video data I_DATA may be determined as one of a wide color space and a narrow color space, and/or the color space signal CS may represent one of a wide color space and a narrow color space.

Figure 7:
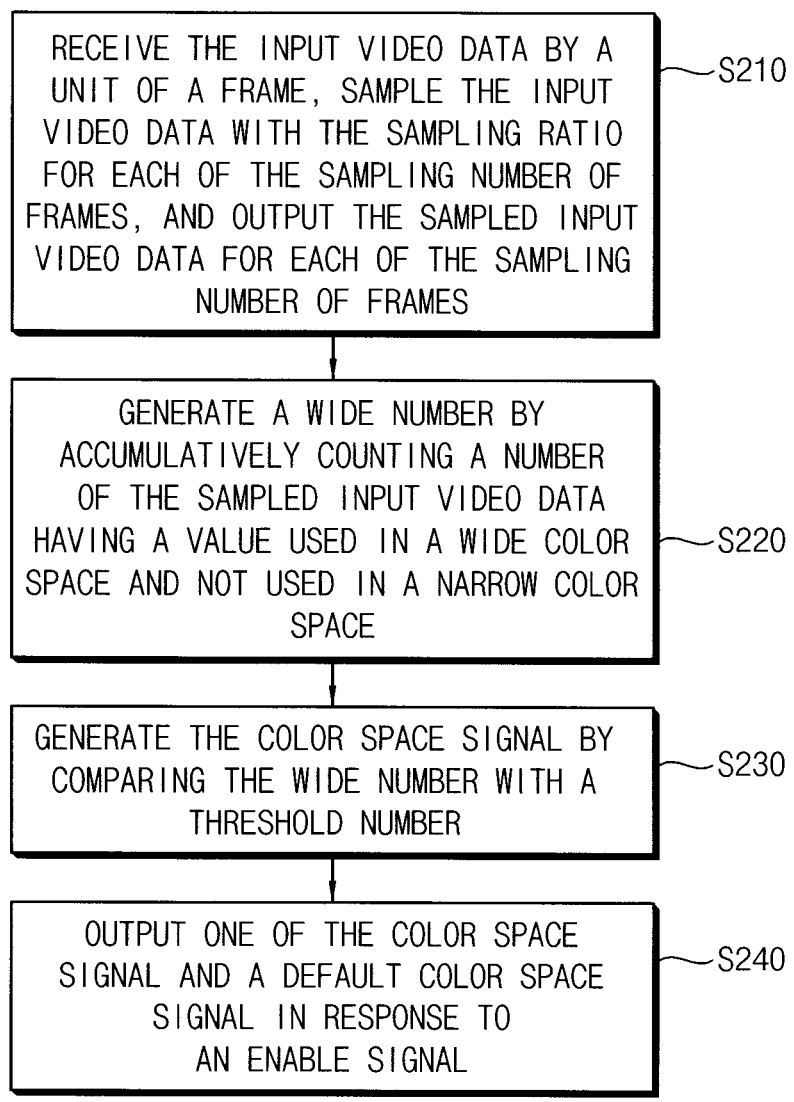
FIG. 7 is a flow chart illustrating an example of a step of generating a color space signal included in a method of determining a color space of FIG. 6.

FIG. 7 is a flow chart illustrating an example embodiment of a step of generating a color space signal included in a method of determining a color space of FIG. 6.

Referring to FIG. 7, the input video data I_DATA may be received by a unit of a frame, the input video data I_DATA may be sampled with the sampling ratio S_RATIO for each of the sampling number S_FNUM of frames, and/or the sampled input video data S_DATA for each of the sampling number S_FNUM of frames may be output (step S210). A wide number W_NUM may be generated by accumulatively counting a number of the sampled input video data S_DATA having a value used in a wide color space and not used in a narrow color space among the sampled input video data S_DATA sampled from the sampling number S_FNUM of frames of the input video data I_DATA (step S220). The color space signal CS may be generated by comparing the wide number W_NUM with a threshold number W_TH (step S230).

In example embodiments, the wide number W_NUM may be generated by accumulatively counting a number of the sampled input video data S_DATA having a value from 0 to 15 or from 236 to 255 among the sampled input video data S_DATA sampled from the sampling number S_FNUM of frames of the input video data I_DATA. The color space of the input video data I_DATA may be determined as a narrow color space and the color space signal CS having a first logic level may be generated when the wide number W_NUM is less than the threshold number W_TH. Alternatively, the color space of the input video data I_DATA may be determined as a wide color space and the color space signal CS having a second logic level may be generated when the wide number W_NUM is equal to or greater than the threshold number W_TH.

As described above, if the color space of the input video data I_DATA may be determined by sampling all the input video data I_DATA included in a frame, a time required to analyze one frame may increase such that an overall operation speed of a display device in which the method of determining a color space is performed may be slowed down. Therefore, in the method of determining a color space according to example embodiments, only a part of the input video data I_DATA among all the input video data I_DATA included in a frame may be sampled with the sampling ratio S_RATIO to determine the color space of the input video data I_DATA. As such, the method of determining a color space according to example embodiments may decrease a time required to analyze one frame such that the method of determining a color space may not influence an overall operation speed of the display device. In addition, in the method of determining a color space according to example embodiments, the sampling ratio S_RATIO may be decreased and the sampling number S_FNUM may be increased as the resolution RES of the input video data I_DATA increases. Alternatively, the sampling ratio S_RATIO may be increased and the sampling number S_FNUM may be decreased as the resolution RES of the input video data I_DATA decreases. As such, the method of determining a color space according to example embodiments may control a time required to analyze one frame.

Images of consecutive frames are similar to each other in general video data. Therefore, if the input video data I_DATA of same locations in a frame are sampled for each of the sampling number S_FNUM of frames, a possibility of determining the color space of the input video data I_DATA incorrectly may increase. Therefore, in the method of determining a color space according to example embodiments, the input video data I_DATA at different locations in a frame for each of the sampling number S_FNUM of frames may be sampled to decrease a possibility of determining the color space of the input video data I_DATA incorrectly.

In example embodiments, an enable signal ENABLE and/or a default color space signal D_CS representing one of a wide color space and a narrow color space may be received from outside, and one of the color space signal CS and the default color space signal D_CS may be output in response to the enable signal ENABLE (step S240). For example, the color space signal CS may be output when the enable signal ENABLE has a logic high level, and the default color space signal D_CS may be output when the enable signal ENABLE has a logic low level. Therefore, in the method of determining a color space according to example embodiments, the color space signal CS representing the color space of the input video data I_DATA determined by an operation described above may be output when the enable signal ENABLE having a logic high level is received from outside, and the default color space signal D_CS (that may or may not be predetermined) as representing one of a wide color space and a narrow color space regardless of the input video data I_DATA may be output when the enable signal ENABLE having a logic low level is received from outside.

Figure 8:
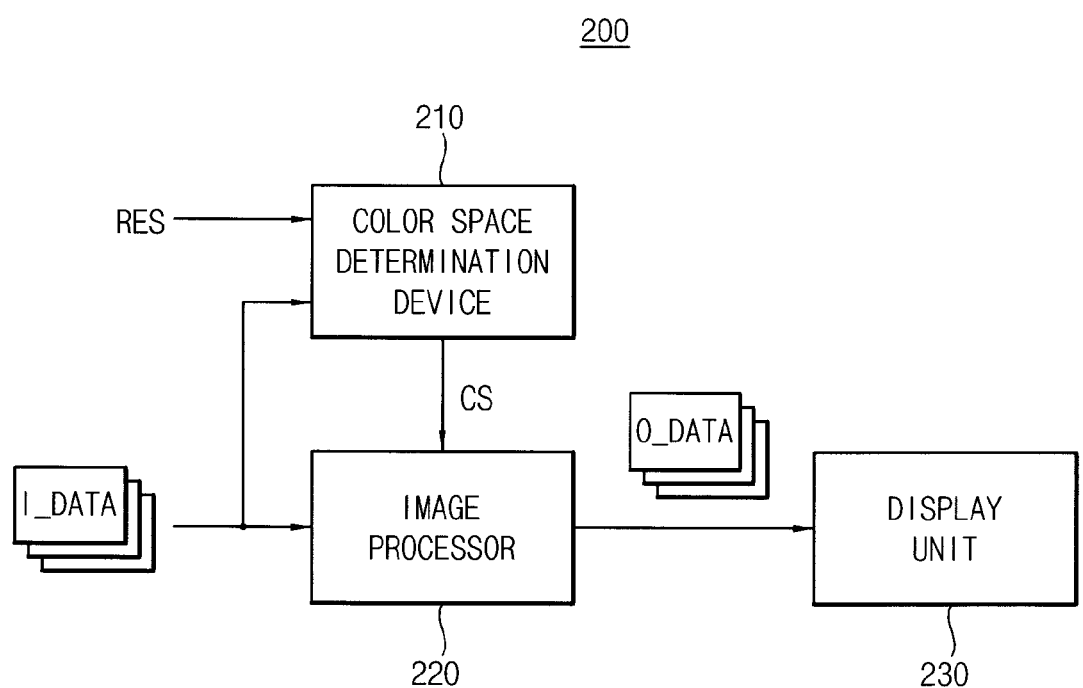
FIG. 8 is a block diagram illustrating a display device according to example embodiments.

FIG. 8 is a block diagram illustrating a display device according to example embodiments.

Referring to FIG. 8, a display device 200 may include a color space determination device 210, an image processor 220, and/or a display unit 230.

The color space determination device 210 may generate a color space signal CS representing a color space of input video data I_DATA based on a resolution RES of the input video data I_DATA.

The color space determination device 210 of FIG. 8 may be embodied with the color space determination device 100 of FIG. 1. A structure and an operation of the color space determination device 100 of FIG. 1 are described above with reference to FIGS. 1 to 5. Therefore, a detail description of the color space determination device 210 of FIG. 8 will be omitted.

The image processor 220 may receive the input video data I_DATA and/or may generate output video data O_DATA by converting a format of the input video data I_DATA based on the color space signal CS received from the color space determination device 210. The image processor 220 may generate the output video data O_DATA by converting a format of the input video data I_DATA into a RGB format. The image processor 220 may convert a format of the input video data I_DATA such that the output video data O_DATA may have a wide color space when the color space signal CS represents a wide color space, and may convert a format of the input video data I_DATA such that the output video data O_DATA may have a narrow color space when the color space signal CS represents a narrow color space. For example, the image processor 220 may store a first conversion coefficient corresponding to a wide color space and a second conversion coefficient corresponding to a narrow color space, and/or may generate the output video data O_DATA by converting a format of the input video data I_DATA into a RGB format using one of the first conversion coefficient and the second conversion coefficient selected in response to the color space signal CS received from the color space determination device 210.

The display unit 230 may receive the output video data O_DATA from the image processor 220 and/or may display the output video signal O_DATA.

As described above, the display device 200 may determine the color space of the input video data I_DATA and/or may generate the output video data O_DATA by converting a format of the input video data I_DATA based on the determined color space of the input video data I_DATA. Therefore, the display device 200 according to example embodiments may increase a performance of a color reproduction.

Figure 9:
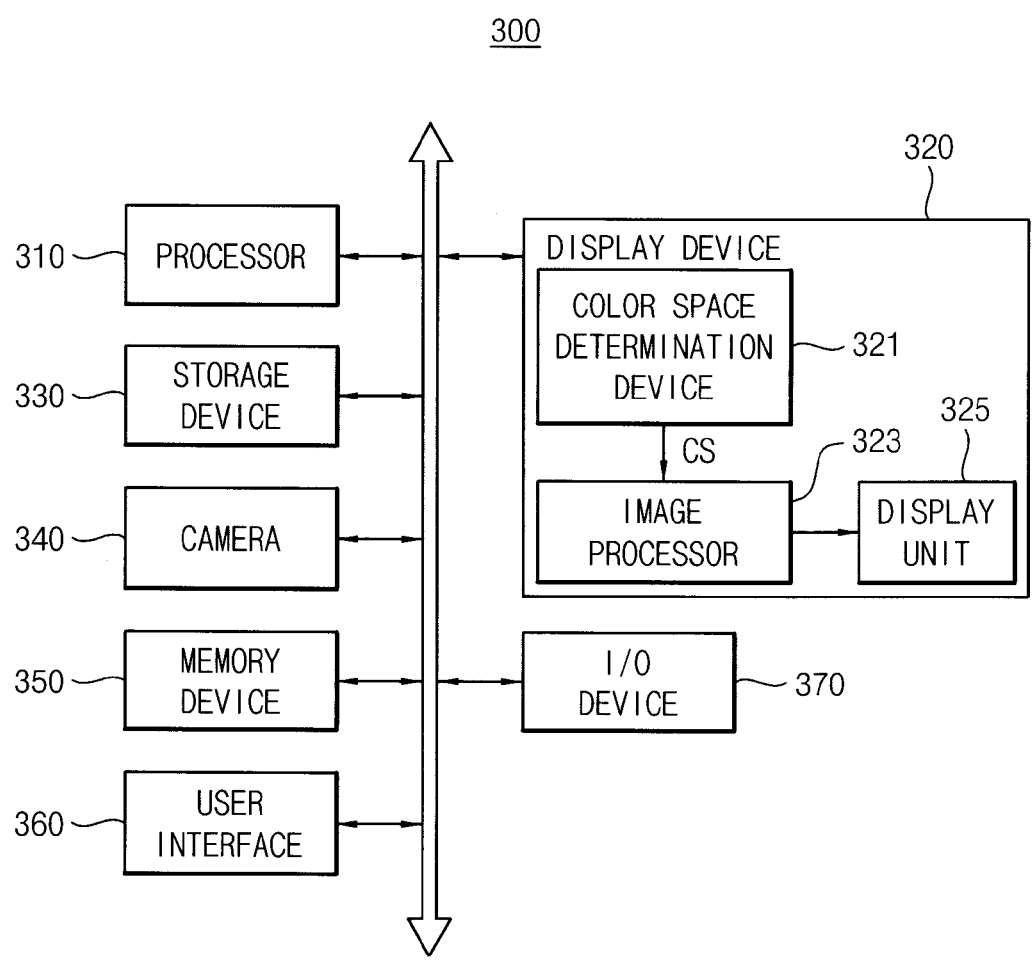
FIG. 9 is a block diagram illustrating a system according to example embodiments.

FIG. 9 is a block diagram illustrating a system according to example embodiments.

A system 300 may include a processor 310, a display device 320, and/or a storage device 330.

The storage device 330 may store video data. The storage device 330 may include a solid state drive (SSD), a hard disk drive (HDD), a compact disk read-only memory (CD-ROM) drive, etc.

The processor 310 may read the video data stored in the storage device 330 and/or may provide the read video data to the display device 320 as input video data.

The display device 320 may determine a color space of the input video data, may generate output video data by converting a format of the input video data into a RGB format based on the determined color space of the input video data, and/or may display the output video data. The display device 320 may include a color space determination device 321, an image processor 323, and/or a display unit 325. The color space determination device 321 may generate a color space signal CS representing a color space of the input video data based on a resolution of the input video data. The image processor 323 may receive the input video data and/or may generate the output video data by converting a format of the input video data into a RGB format based on the color space signal CS received from the color space determination device 321. The display unit 325 may receive the output video data from the image processor 323 and/or may display the output video data reflected, for example, in an output video signal.

The display device 320 of FIG. 9 may be embodied with the display device 200 of FIG. 8. Therefore, the color space determination device 321, the image processor 323, and/or the display unit 325 included in the display device 320 of FIG. 9 may be embodied with the color space determination device 210, the image processor 220, and/or the display unit 230 included in the display device 200 of FIG. 8, respectively. A structure and an operation of the display device 200 of FIG. 8 are described above with reference to FIGS. 1 to 5 and 8. Therefore, a detail description of the display device 320 of FIG. 9 will be omitted.

The processor 310 may perform various computing functions, such as executing specific software for performing specific calculations or tasks. For example, the processor 310 may be a microprocessor or a central process unit. The processor 310 may be connected to the display device 320 and the storage device 330 via bus such as an address bus, a control bus or a data bus, etc. The processor 310 may be connected to an extended bus, such as peripheral component interconnect (PCI) bus.

The processor 310 may be embodied as a single core architecture or a multi core architecture. For example, the processor 310 may be embodied as a single core architecture when an operating frequency of the processor 310 is less than 1 GHz, and/or the processor 310 may be embodied as a multi core architecture when an operating frequency of the processor 310 is greater than 1 GHz. The processor 310 that is embodied as a multi core architecture may communicate with peripheral devices via an advanced extensible interface (AXI) bus.

The system 300 may further include a camera 340, a memory device 350, a user interface 360, and/or an input/output device 370. Although not illustrated in FIG. 9, the system 300 may further include ports to communicate with a video card, a sound card, a memory card, a universal serial bus (USB) device, etc.

The camera 340 may generate video data by capturing images. In this case the processor 310 may provide the input video data to the display device 320 by reading the video data generated by the camera 340 as well as by reading the video data stored in the storage device 330.

The memory device 350 may store data required for an operation of the system 300. The memory device 350 may be a volatile memory such as a dynamic random access memory (DRAM), a static random access memory (SRAM), etc., or a non-volatile memory such as an erasable programmable read-only memory (EPROM), an electrically erasable programmable read-only memory (EEPROM), a flash memory, etc.

The user interface 360 may include devices required for a user to control the system 300. The input/output device 370 may include an input device (e.g., a keyboard or a mouse), an output device (e.g., a printer), etc.

The system 300 may be a mobile device, a smart phone, a cellular phone, a desktop computer, a laptop computer, a work station, a handheld device, a digital camera, or the like.

While example embodiments have been particularly shown and described, it will be understood by those of ordinary skill in the art that various changes in form and details may be made therein without departing from the spirit and scope of the present invention as defined by the following claims.

What is claimed is:

1. A color space determination device, comprising:
   a sampling configuration unit configured to determine a sampling ratio and a sampling number based on a resolution of input video data, the sampling ratio being a ratio of a number of the input video data to be sampled to a total number of the input video data included in a frame, the sampling number being a number of frames to be sampled; and
   a determination unit configured to receive the input video data in units of frames, to sample the input video data with the sampling ratio for each of the sampling number of frames, and to generate a color space signal representing a color space of the input video data based on the sampled input video data that are sampled from the sampling number of frames of the input video data.

2. The color space determination device of claim 1, wherein the sampling configuration unit decreases the sampling ratio and increases the sampling number as the resolution of the input video data increases.

3. The color space determination device of claim 1, wherein the sampling configuration unit includes a table having entries, each of which stores data for the sampling ratio, the sampling number, and the resolution.

4. The color space determination device of claim 3, wherein the sampling configuration unit reads the data for the sampling ratio and the data for the sampling number from an entry of the table that stores the data for the resolution corresponding to the resolution of the input video data, and outputs the read sampling ratio and the read sampling number as the sampling ratio and the sampling number, respectively.

5. The color space determination device of claim 1, wherein the determination unit samples the input video data at different locations in a frame for each of the sampling number of frames.

6. The color space determination device of claim 1, wherein the determination unit generates the color space signal based on a number of the sampled input video data having a value used in a wide color space and not used in a narrow color space.

7. The color space determination device of claim 1, wherein the determination unit includes:
   a sampling unit configured to receive the input video data in units of frames, to sample the input video data with the sampling ratio for each of the sampling number of frames, and to output the sampled input video data for each of the sampling number of frames;
   an examination unit configured to generate a wide number by accumulatively counting a number of the sampled input video data having a value used in a wide color space and not used in a narrow color space among the sampled input video data sampled from the sampling number of frames of the input video data; and
   a comparison unit configured to generate the color space signal by comparing the wide number with a threshold number.

8. The color space determination device of claim 7, wherein the sampling unit samples the input video data included in a sampling region of a frame, which has an area corresponding to the sampling ratio, for each of the sampling number of frames, the sampling regions of the sampling number of frames being different from each other.

9. The color space determination device of claim 7, wherein the examination unit generates the wide number by accumulatively counting a number of the sampled input video data having a value from 0 to 15 or from 236 to 255 among the sampled input video data sampled from the sampling number of frames of the input video data.

10. The color space determination device of claim 7, wherein the examination unit receives the sampling number from the sampling configuration unit, and resets the wide number after receiving the sampled input video data from the sampling unit the sampling number of times.

11. The color space determination device of claim 7, wherein the comparison unit determines a color space of the input video data as the narrow color space and generates the color space signal having a first logic level when the wide number is less than the threshold number, and determines the color space of the input video data as the wide color space and generates the color space signal having a second logic level when the wide number is equal to or greater than the threshold number.

12. The color space determination device of claim 7, wherein the determination unit further includes a multiplexer configured to output one of the color space signal received from the comparison unit and a default color space signal representing one of the wide color space and the narrow color space in response to an enable signal.

13. The color space determination device of claim 12, wherein the multiplexer outputs the color space signal received from the comparison unit when the enable signal has a logic high level, and outputs the default color space signal when the enable signal has a logic low level.

14. A display device, comprising:
a color space determination device configured to generate a color space signal representing a color space of input video data based on a resolution of the input video data;
an image processor configured to receive the input video data, and to generate output video data by converting a format of the input video data based on the color space signal; and
a display unit configured to display the output video data;
wherein the color space determination device includes:
a sampling configuration unit configured to determine a sampling ratio and a sampling number based on the resolution of the input video data, the sampling ratio being a ratio of a number of the input video data to be sampled to a total number of the input video data included in a frame, the sampling number being a number of frames to be sampled; and
a determination unit configured to receive the input video data in units of frames, to sample the input video data with the sampling ratio for each of the sampling number of frames, and to generate the color space signal based on the sampled input video data that are sampled from the sampling number of frames of the input video data.

15. The display device of claim 14, wherein the image processor stores a first conversion coefficient corresponding to a wide color space and a second conversion coefficient corresponding to a narrow color space, and generates the output video data by converting a format of the input video data into a red, green, blue (RGB) format using one of the first conversion coefficient and the second conversion coefficient selected in response to the color space signal.

16. A system, comprising:
a storage device; and
a display device;
wherein the storage device is configured to store video data,
wherein the display device includes:
a color space determination device;
an image processor; and
a display unit;
wherein the color space determination device is configured to sample the video data,
wherein the color space determination device is configured to generate a color space signal representing a color space of the video data based on the sampled video data,
wherein the image processor is configured to generate output video data based on the sampled video data and the color space signal, and
wherein the display unit is configured to display the output video data.

17. The system of claim 16, wherein the sampled video data is sampled based on a sampling ratio and a sampling number derived from a resolution of the video data.

18. The system of claim 16, wherein the image processor generates the output video data by converting a format of the video data into a red, green, blue (RGB) format.

19. The system of claim 16, wherein the image processor stores a first conversion coefficient corresponding to a wide color space and a second conversion coefficient corresponding to a narrow color space, and
wherein the image processor generates the output video data by converting a format of the video data into a red, green, blue (RGB) format using one of the first conversion coefficient and the second conversion coefficient selected in response to the color space signal.

20. The system of claim 16, wherein the video data is sampled at different locations for each frame of the video data that is sampled.

* * * * *